United States Patent Office 3,278,309
Patented Oct. 11, 1966

3,278,309
PRODUCTION OF DRIED VEGETABLE JUICES AS FEEDSTUFF FOR ANIMALS
Robert Heap, Tadworth, Surrey, and Godfrey Herbert Owtram, London, England, assignors to Charles Page & Company Limited, London, England, a corporation of Great Britain
No Drawing. Filed Sept. 6, 1962, Ser. No. 221,881
Claims priority, application Great Britain, Sept. 8, 1961, 32,416/61
4 Claims. (Cl. 99—6)

This invention relates to the dehydration of vegetable juices obtained from sugar cane, sugar beet and carrots, and in particular to improvements arising from the addition of certain materials during the drying process. By means of this invention, the dehydration to a dry, non-hygroscopic, pulverulent product, for example in granular form, is aided, and the tendency of the product subsequently to cake to a lump is reduced or avoided.

The invention may be applied with particular advantage to processes for obtaining sugar from sugar cane for human consumption, in which juices obtained from sugar cane are evaporated to form pure crystals of sugar which are then removed, the remainder which contains a large proportion of waste matter being then subsequently treated with the process of this invention.

According to the present invention a process for the dehydration of vegetable juices comprises in a first stage, the addition to a vegetable juice concentrated to a treacle-like consistency of a dry, inert, non-hygroscopic, insoluble powder to form a fine dispersion throughout and, in a second stage, dehydration of the product of the first stage to form a substantially dry non-hygroscopic powder.

According to the present invention from a further standpoint a process for the dehydration of vegetable juices comprises (1) one or more concentration steps to bring the vegetable juice to a treacle-like consistency, (2) the addition to the product of stage (1) of a dry, inert, non-hygroscopic, insoluble powder to form a fine dispersion throughout the product, and (3) dehydration of the product of stage (2) to form a substantially dry non-hygroscopic powder.

The present invention is especially suitable for the preparation of animal foodstuffs from cane sugar. A very satisfactory and economic process involves crushing sugar cane to extract the juice, this juice then being subjected to an initial evaporation step to allow the removal as crystals of part of the sugar present. The crystals so removed are suitable for human consumption, while the remaining matter can be further concentrated to molasses and subjected to the process of the present invention.

Although not absolutely essential, it will be found in all cases in practice to be desirable to neutralize the vegetable juice initially, so as to prevent inversion of the sucrose, by, for example, the addition of lime.

Whether a portion of the sucrose is removed during the concentration process as indicated above or not, concentration of the vegetable juice is normally continued, preferably under reduced pressure, until a concentration is reached of at least 85° Brix. By the time this concentration is reached the vegetable juice will have a treacle-like consistency, from which the removal of further water is extremely difficult to achieve, and it is an object of the present invention to enable the production from the treacle-like mass of a dry non-hygroscopic powder.

As stated above, in accordance with the present invention a dry, inert, non-hygroscopic, insoluble powder is added to the concentrated vegetable juice in the first stage of the process. This powder must be added so as to form a fine dispersion throughout the mass, and has the effect of discouraging the growth of crystals as they form when the concentrated solution is dehydrated beyond the saturation point. The powder may comprise for example vegetable starch, such as maize, tapioca or potato starch, or tricalcium, phosphate, kaolin, talc, an alkaline earth carbonate including in this term magnesium carbonate. Mixtures of any of the above substances may be used equally satisfactorily. Among the alkaline earth carbonates, calcium carbonate is particularly preferred. Where products are to be used as animal foodstuffs, one will not normally use barium carbonate or strontium carbonate.

The amount of the powder added in this first stage may vary over wide limits. Some of the substances have a greater effect at small concentrations than others, but in general at least 1% by weight of solids present in the concentrated vegetable juice is desirable. Normally the concentration will range from 1 to 15%, preferably 2–8%, by weight of solids present in the concentrated vegetable juice. The upper weight limit is dependent largely on the economics of the process, and high concentrations much above the 15% mentioned are wasteful, and produce no substantial advantage.

The powder must be added to the concentrated treacle-like mass in a manner which causes it to form a fine dispersion throughout. This may conveniently be achieved by applying vigorous agitation with a high speed stirrer.

In a refinement of the process of the invention, there is also added to the concentrated treacle-like mass part of the dry powder product formed at the end of the process. This powder contains minute crystals, and so acts as a seeding agent to encourage the formation of further crystals. The addition of this end product in the first stage may be performed either simultaneously as the addition of the dry, inert, non-hygroscopic, insoluble powder or in a separate addition step. It is preferred to add the powder obtained as end product of the process to the treacle-like mass in an amount of up to 10% by weight of solids present in the concentrated vegetable juice.

Following the first stage of the process, the mass is now dehydrated, preferably under reduced pressure to form a substantially dry non-hygroscopic powder. A certain amount of moisture is permissible in the product of, for example, 5% by weight, though preferably not more than 3% by weight.

The vacuum is preferably maintained throughout the whole dehydration process, since the time required is thereby appreciably reduced. However, if the vacuum is broken after addition of the additive, the mass is reheated to about 135° C. to maintain the solids in solution. The treated mass is then emptied into crystallisers. Under the effect of further heat and, if desired, agitation the remainder of the water is driven off leaving a dry powder as residue.

The powder obtained at the end of the process will normally have particles of material up to around ⅛ of an inch in size. In general, however, the process is so operated as to obtain particles of as small a size as possible.

The granular powder resulting from this process is not only materially superior to the products of processes used hitherto as regards any tendency to agglomerate, but also is found to be as good, if not better than these for purposes of pelletisation.

The process of this invention may be illustrated by the following typical example.

*Example*

The sugar cane is crushed, and the raw juice freed from bagasse and the bulk of easily separable insoluble matter. It is then neutralized by stirring in calcium hydroxide. The liquid obtained is concentrated in a vacuum evaporator until the density increases to 85–90° Brix, and is fed continuously to a high speed rotary stirrer.

At the same time, a quantity of starch equivalent to 5% by weight of the finished product is fed continuously to the rotary stirrer, together with 10% of the dried product, which is returned to the system at this point.

The mixture which is obtained in the stirring operation is fed to a drum dryer by means of a screw conveyor. The temperature and speed of the drum dryer, and the rate of feed, are adjusted so as to give a granular product containing approximately 1% of water. A typical analysis of the product obtained in this way is as follows:

| | |
|---|---|
| Polarization | 82°. |
| Reducing sugar | 4% by weight of solids. |
| Total sugar | 86% by weight of solids. |
| Protein | 1% by weight of solids. |
| Ash | 3.5% by weight of solids. |
| Starch added | 5% by weight of solids. |
| Moisture | 3% by weight of solids. |

What is claimed is:
1. A process for the dehydration of vegetable juices to form animal foodstuffs which comprises:
   in a first stage, the addition to a vegetable juice selected from the group consisting of juices prepared from sugar cane, sugar beet and carrots and concentrated to a treacle-like consistency, of at least one dry powdered material selected from the group consisting of tricalcium phosphate, kaolin, talc and alkaline earth carbonates, the powdered material being added in an amount of from one to fifteen percent by weight of solids present in the vegetable juice, and,
   in a second stage, dehydration of the product of the first stage to form a non-hygroscopic powder.
2. A process as claimed in claim 1 wherein the non-hygroscopic powder formed in the second stage contains at most 5% by weight of moisture.
3. A process for the dehydration of sugar can juice to form an animal foodstuff which comprises:
   in a first stage, the addition to a juice prepared from sugar cane and having a concentration of at least 85° Brix of a dry powdered material selected from the group consisting of tricalcium phosphate and calcium carbonate in an amount of from two to eight percent by weight of solids present in the sugar cane juice, and,
   in a second stage, dehydration of the product of the first stage to form a non-hygroscopic powder containing at most 3% by weight of moisture.
4. A process as cliamed in claim 3 in which part of the powder formed in the second stage is recycled and also added with the dry powdered material to the concentrated sugar cane juice in the first stage to form a fine dispersion, the recycled powder being added in an amount of up to 10% by weight of solids present in the sugar cane juice.

References Cited by the Examiner

UNITED STATES PATENTS

| | | | |
|---|---|---|---|
| 2,236,844 | 4/1941 | Cocke et al. | 99—6 |
| 2,965,488 | 12/1960 | Belasco | 99—2 |
| 2,967,106 | 1/1961 | Kviesitis | 99—6 |
| 3,033,684 | 5/1962 | Winn | 99—6 |
| 3,078,164 | 2/1963 | De Lisle | 99—6 |
| 3,103,439 | 9/1963 | Williams | 99—6 |

OTHER REFERENCES

Technology of Sugar, M'Intosh, 3rd edition, 1916, pages 360–364, 368 and 492.

A. LOUIS MONACELL, *Primary Examiner.*

BEATRICE H. STRIZAK, *Examiner.*

S. J. BAICKER, R. N. JONES, *Assistant Examiners.*